United States Patent [19] [11] 4,197,274
Nemoto et al. [45] Apr. 8, 1980

[54] PROCESS FOR REDUCING PLUTONIUM

[75] Inventors: Shinichi Nemoto; Satoshi Ikeda, both of Katsuta; Hiroaki Kobayashi; Naomi Tsunoda, both of Naka, all of Japan

[73] Assignee: Doryokuro Kakunenryo Kaihatsu Jigyodan, Tokyo, Japan

[21] Appl. No.: 893,304

[22] Filed: Apr. 4, 1978

[30] Foreign Application Priority Data

Apr. 5, 1977 [JP] Japan .................. 52-38915

[51] Int. Cl.$^2$ ............................................. C01G 56/00
[52] U.S. Cl. ...................................... 423/3; 423/251
[58] Field of Search ............................ 423/3, 10, 251

[56] References Cited

U.S. PATENT DOCUMENTS

| | | | |
|---|---|---|---|
| 3,092,446 | 6/1963 | Morgan et al. | 423/10 |
| 3,276,850 | 10/1966 | Rainey | 423/10 |
| 3,374,068 | 3/1968 | Erlandson et al. | 423/10 X |
| 3,730,851 | 5/1973 | Schwind et al. | 423/10 X |

FOREIGN PATENT DOCUMENTS 738320 7/1966 Canada ..................................... 423/3

OTHER PUBLICATIONS

Moore, F. L. et al. "Separation and Determination of Plutonium by Liquid-Liquid Extraction" *Anal. Chem.* 29(12); 1767–70 1957.
Cleveland, J. M. *The Chemistry of Plutonium* pp. 48–58, Gordon & Breach Science Pub. N.Y. 1970.
Nuc. Sci. Abs. 23:379, 1969.

*Primary Examiner*—Richard E. Schafer
*Attorney, Agent, or Firm*—Wenderoth, Lind & Ponack

[57] ABSTRACT

A process for reducing plutonium is provided in which hydrazine is added as a reducing agent to a nitric acid solution of tetravalent plutonium in the presence of active carbon catalyst to thereby reduce tetravalent plutonium into trivalent plutonium.

3 Claims, No Drawings

PROCESS FOR REDUCING PLUTONIUM

BACKGROUND OF THE INVENTION

The present invention relates to a process for reducing plutonium contained in a plutonium waste liquor resulting from a retreating process of a used nuclear fuel or a treating process of a retreated waste liquor or from a plutonium-processing plant, or plutonium used in those facilities.

As reducing agents for plutonium, there have been used uranous nitrate, ferrous sulfamate, ferrous nitrate and the like.

For example, in the chemical process for re-treating a used fuel, uranous nitrate is used as reducing agent at present. For this purpose, uranyl nitrate must be first reduced into uranous nitrate by electrolysis. Uranous ion reacts with nitric acid ion to form nitrous acid according to the following reaction formula (1):

$$U^{4+} + NO_3^- + H_2O \rightleftharpoons UO_2^{2+} + HNO_2 + H^+ \qquad (1)$$

This reaction proceeds very slowly. If the reaction system is left as it is, the nitrous acid thus formed oxidizes the uranous ion rapidly and continuously according to the following reaction formula (2):

$$U^{4+} + 2HNO_2 \rightarrow UO_2^{2+} + 2H^+ + 2NO \qquad (2)$$

Therefore, hydrazine is incorporated previously in the reaction system as an antioxidant for the uranous ion. If hydrazine is incorporated in the reaction system, it reacts with nitrous acid to form decomposition products, i.e. $N_2O$ and $N_2$ gases according to the following reaction formulae (3) and (4):

$$N_2H_5^+ + HNO_2 \rightarrow HN_3 + 2H_2O + H^+ \qquad (3)$$

$$HN_3 + HNO_2 \rightarrow N_2O \uparrow + N_2 \uparrow + H_2O \qquad (4)$$

Since the above decomposition reactions proceed very rapidly, nitrous acid formed slowly according to the reaction formula (1) is decomposed rapidly according to the reactions shown by the above-described reaction formulae (3) and (4) to prevent oxidation of uranous ion shown by the reaction formula (2). Such a prevention of oxidation can be observed also in the case of plutonium (III) reduced by uranous ion. In the case of plutonium, nitrous acid is formed slowly according to the reaction formula (5). The nitrous acid thus formed reacts rapidly with plutonium (III) to oxidize the latter according to the reaction formula (6):

$$2Pu^{3+} + NO_3^- + 3H^+ \rightarrow 2Pu^{4+} + HNO_2 + H_2O \qquad (5)$$

$$Pu^{3+} + HNO_2 + H^+ \rightarrow Pu^{4+} + H_2O + NO \qquad (6)$$

In order to prevent the oxidation, hydrazine is used as in the case of uranous ion. Hydrazine decomposes nitrous acid according to the above-described reaction formulae (3) and (4) to prevent plutonium from re-oxidation. Either way, hydrazine has been used heretofore as a mere stabilizer for uranous ion or plutonium (III).

Uranium used as reducing agent for plutonium (IV) in this chemical re-treating process is a useful nuclear fuel substance. Uranium necessitated as reducing agent for plutonium is increased in amount as treating capacity of the plant is increased and, accordingly, the absolute quantity of uranium stocked in the plant is increased to cause a great economical loss in a nuclear fuel cycle. Further, a large amount of uranium will be required in future for treating a great amount of plutonium contained in a used fuel from fast breeders. Thus, plutonium treatment will become difficult according to the conventional process in the future.

Under the circumstances as mentioned above, investigations on electrolytic reduction of plutonium have been made recently in Karlsruhe Institute, West Germany. (H. Schmieder, Electrolytic methods for application in the Purex process, ISEC-74-3.) However, cost of this electrolytic process is high, since a special extractor comprising a platinum mixing pillar anode and a titanium alloy cathode is required in this process. In addition, this process includes difficulties such as that precise control of the electrolytic current is required in respective steps in the extractor. Also in this electrolytic process, hydrazine is used as a stabilizer for electrolytically reduced plutonium (III).

On the other hand, in the treatment of waste liquors from group separation of re-treated waste liquors or from plutonium-processing plants, ferrous sulfamate, ferrous nitrate, etc. are used as reducing agent for plutonium for the purpose of analysis. However, these reducing agents yield an increased amount of waste products, since they contain iron. Moreover, the iron acts as an impurity to make the analysis difficult. Particularly, in case ferrous sulfamate is used, another defect is caused in that metal materials used are corroded by sulfamic acid, in addition to said defects. Also in this process, hydrazine is used as stabilizer for plutonium (III).

Namely, in conventional processes as above-described, hydrazine incorporated in the reaction system is used merely as stabilizer for uranous ion or plutonium (III).

SUMMARY OF THE INVENTION

The present invention has been attained under the above-described circumstances of conventional techniques.

An object of the present invention is to provide a process for efficiently reducing a large amount of plutonium (IV) by a very simple procedure wherein defects of conventional process for reducing plutonium used for various purposes are overcome.

In the present invention, hydrazine which has been utilized heretofore as a mere stabilizer for uranous ion or plutonium (III) is utilized positively as a reducing agent.

According to the present invention, hydrazine is added as a reducing agent in a nitric acid solution of tetravalent plutonium in the presence of active carbon catalyst to thereby reduce tetravalent plutinium into trivalent plutonium.

Other objects and advantages of the invention will become apparent by reference to the following detailed description.

DESCRIPTION OF THE PREFERRED EMBODIMENT

Nitric acid solution containing plutonium (IV) as plutonium nitrate in an amount of 1 to 20 g/l is placed in a reaction vessel containing active carbon catalyst in an amount of 50 to 100 g/l of the nitric acid solution. The normality of nitric acid solution is generally from 0.1 to 1 N. The nitric acid solution of lower than 0.1 N is not employed, because plutonium hydroxide precipitates in the solution. On the other hand, in the nitric acid solution of higher than 1 N, the reductive action of hydrazine decreases. Hydrazine is then added to the nitric acid solution in an amount of at least 0.2 M/l and dissolved therein. Thereafter, the whole mixture is allowed to stand for several to ten-odd minutes to effect the reaction at the room temperature. Hydrazine is decomposed in the nitric acid solution containing plutonium (IV) in the presence of the active carbon catalyst, and plutonium (IV) is reduced into plutonium (III) with the decomposition of hydrazine. After 2 to 3 minutes after addition of hydrazine, about a half of plutonium (IV) of the initial amount is reduced, and after about 10 to 15 minutes, almost all of plutonium (IV) is reduced to plutonium (III). After completion of the reaction, the active carbon is separated out to obtain plutonium (III) of a purity of higher than 99%.

Hydrazine used as a reducing agent may also act as a stabilizer for plutonium (III) as in the conventional uranous process or electrolytic process. Therefore, it is preferred to add an excess amount of hydrazine so that it exists even at the completion of the reduction of plutonium (IV) to plutonium (III). This may be accomplished by initially adding excess amount of hydrazine into the nitric acid solution containing plutonium (IV), by additionally adding hydrazine in the course of the reduction of plutonium (IV), or by adding supplemental hydrazine into the resulting nitric acid solution containing plutonium (III) at the completion of the reduction. The effective amount of hydrazine as a stabilizer is at least 0.05 M per plutonium (III) of 1 to 20 g.

It has been confirmed by experiments that the active carbon used for the reaction can be reused again.

It has also been confirmed by experiments that, though ferric nitrate is reduced into ferrous nitrate, uranium is hardly reduced under the same conditions and, therefore, ferric nitrate is selectively reduced even in the presence of uranium. From this, it may be naturally considered that selective reduction of plutonium (IV) occurs also in a system containing uranium. Therefore, the present invention is particularly effective when it is used instead of the uranous process for separation of uranium from plutonium in a chemical re-treating step of used fuels. In this process, only a very small amount of uranous ion corresponding to that of plutonium oxidized in the extraction procedure is supplied. Thus, uranous uranium necessitated for the re-treatment of not only fuels used in a current light-water type power reactor, but also fuels used in a fast breeder, in the future, will be a very small amount.

The present invention will be illustrated with reference to an example. 100 grams of active carbon washed thoroughly with nitric acid were charged in a reaction vessel. Then, one liter of 0.5 N nitric acid-acidic solution containing 1.2 g/l of plutonium nitrate [Pu(NO$_3$)$_4$] was added thereto and further hydrazine necessitated for the reaction was added thereto and dissolved therein to effect the reaction. Initial concentration of hydrazine was 0.5 M. Change in plutonium (III) production with time after addition of hydrazine was determined to obtain the results shown in the following table.

| Time (min) | Pu (III) production (%) |
|---|---|
| 3 | 56.7 |
| 15 | 98.3 |
| 30 | 99.5 |
| 40 | 99.0 |
| 100 | 98.6 |

The above table indicates that in the course of ten-odd minutes after the addition of hydrazine, more than 98% of plutonium (IV) is reduced into plutonium (III) and thereafter, plutonium (III) production is substantially unchanged.

As stated above in detail, the process of the present invention can be effected merely by adding hydrazine to a nitric acid-plutonium (IV) system in the presence of active carbon catalyst and allowing the whole mixture to stand for several minutes to ten-odd minutes. Hydrazine used positively as reducing agent may be utilized also as stabilizer for plutonium (III) as in the conventional processes. Thus, plutonium can be reduced efficiently by a very simple procedure. This process can be applied to the reduction of a large amount of plutonium and the active carbon once used can be used repeatedly as it is. In addition, expensive starting materials are not required. Thus, as compared with the conventional reduction process or electrolytic process wherein uranium is used, far superior effects can be obtained by the process of the present invention.

It is to be realized that only the preferred embodiment of the invention has been disclosed and that numerous modifications, substitutions and alterations are all permissible without departing from the spirit and scope of the invention as defined in the following claims.

What is claimed is:

1. A process for reducing plutonium comprising adding hydrazine as a reducing agent to a nitric acid solution of tetravalent plutonium in the presence of active carbon catalyst to thereby reduce tetravalent plutonium into trivalent plutonium.

2. The process according to claim 1, wherein hydrazine is in an amount sufficient added enough to exist even at the completion of the reduction of plutonium (IV) to plutonium (III), so that hydrazine acts not only as a reducing agent for tetravalent plutonium but also as a stabilizer for resulting trivalent plutonium.

3. The process according to claim 1, wherein the active carbon catalyst is separated from the solution and reused repeatedly.

* * * * *